United States Patent [19]

Chattin

[11] Patent Number: 4,831,642

[45] Date of Patent: May 16, 1989

[54] MAS REGULATOR CIRCUIT FOR HIGH FREQUENCY MEDICAL X-RAY GENERATOR

[75] Inventor: Robert A. Chattin, Mundelein, Ill.

[73] Assignee: Gendex Corporation, Franklin Park, Ill.

[21] Appl. No.: 100,116

[22] Filed: Sep. 23, 1987

[51] Int. Cl.[4] .......... G01T 1/00

[52] U.S. Cl. .......... 378/108; 378/117; 378/97; 378/96

[58] Field of Search .......... 378/117, 118, 101, 103, 378/96, 97, 108, 109, 110

[56] References Cited

U.S. PATENT DOCUMENTS

| | | | |
|---|---|---|---|
| 3,971,945 | 7/1976 | Franke | 378/96 |
| 4,035,648 | 7/1977 | Patel | 378/118 |
| 4,047,043 | 9/1977 | Meyer | 378/117 |
| 4,158,138 | 6/1979 | Hellstrom | 378/117 |
| 4,178,508 | 12/1979 | Hotta et al. | 378/117 |
| 4,593,371 | 6/1986 | Grajewski | 378/108 |
| 4,748,648 | 5/1988 | Boucle et al. | 378/108 |

FOREIGN PATENT DOCUMENTS 0148853 10/1981 Fed. Rep. of Germany .

*Primary Examiner*—Carolyn E. Fields
*Assistant Examiner*—Joseph A. Hynds
*Attorney, Agent, or Firm*—Roger J. French

[57] ABSTRACT

A MAS regulating system for high frequency medical X-ray generator produces a control signal to stop the exposure when the milliamp-seconds delivered by the X-ray tube becomes equal to or greater than a desired maximum amount set by an operator. The system comprises a converter circuit for converting a signal corresponding to a desired MAS value set in by the operator into a first digital signal having a predetermined format. A digital integrator circuit integrates and converts the actual MA current in the X-ray tube to a digital MAS signal corresponding to the actual MAS value of the current in the X-ray tube and in the same predetermined format as the first digital signal. A comparing circuit compares the first and second digital signals and produces a control signal to stop the exposure when the second digital signal is greater than the first digital signal.

8 Claims, 2 Drawing Sheets

MAS REGULATOR CIRCUIT FOR HIGH FREQUENCY MEDICAL X-RAY GENERATOR

BACKGROUND OF THE INVENTION

The present invention is in the field of high frequency medical X-ray generators. More particularly, the invention is directed to improvements in high frequency X-ray generators for the radiographic or medical imaging applications, or so-called diagnostic X-ray equipment. More particularly yet, the invention concerns a milliamp-seconds (MAS) regulator circuit for a high frequency medical X-ray generator.

The invention is directed to a novel and improved milliamp-seconds (MAS) regulator circuit which produces a control signal which may be utilized to stop the X-ray exposure when the milliamp-seconds delivered by the X-ray tube becomes equal to or greater than some predetermined desired amount set by the operator on a control console or the like.

While the comparison of actual X-ray tube MAS to desired MAS has heretofore been utilized for control purposes, our novel and improved system determines the actual MAS in a novel fashion by what will be referred to herein as "digital integration". Moreover, our novel and improved system utilizes a highly reliable digital method of signal processing and comparison for developing a control signal for stopping the exposure in accordance with the actual and desired MAS values.

Advantageously, the use of modern digital circuit components and digital logic-type controls make possible increased accuracy and reliability of the operation and control of the X-ray generator. Moreover, the use of digital control logic also makes possible the addition of further control logic in the MAS regulator circuit arrangement for achieving additional advantageous and desirable control functions. In the preferred embodiment illustrated herein, these further logic controlled functions include inhibiting the operation of the MAS regular circuit when the X-ray tube kilovoltage (KV) is less than 75% of the selected or desired value. Such additional logic control signals may also be utilized to inhibit the operation of the MAS regulator circuit until a digital logic "ready" or "prepared" signal is produced indicating that the generator is prepared to make an exposure.

Briefly, in accordance with the foregoing considerations, a novel and improved MAS regulator system in accordance with the invention comprises first converter circuit means for converting a signal corresponding to a desired MAS value into a first digital signal of a given format; digital integrator circuit means for integrating and converting the actual MA current in the X-ray tube to a digital MAS signal corresponding to the actual MAS value of the current in the X-ray tube, said MAS signal being in the form of a second digital signal of the same predetermined format as said first digital signal; and comparing circuit means for comparing said first and second digital signals and for producing a control signal to stop the exposure when the second digital signal is greater than the first digital signal.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in which like reference numerals identify like elements, and in hich:

DETAILED DESCRIPTION OF THE ILLUSTRATED EMBODIMENT

Figure 1A:
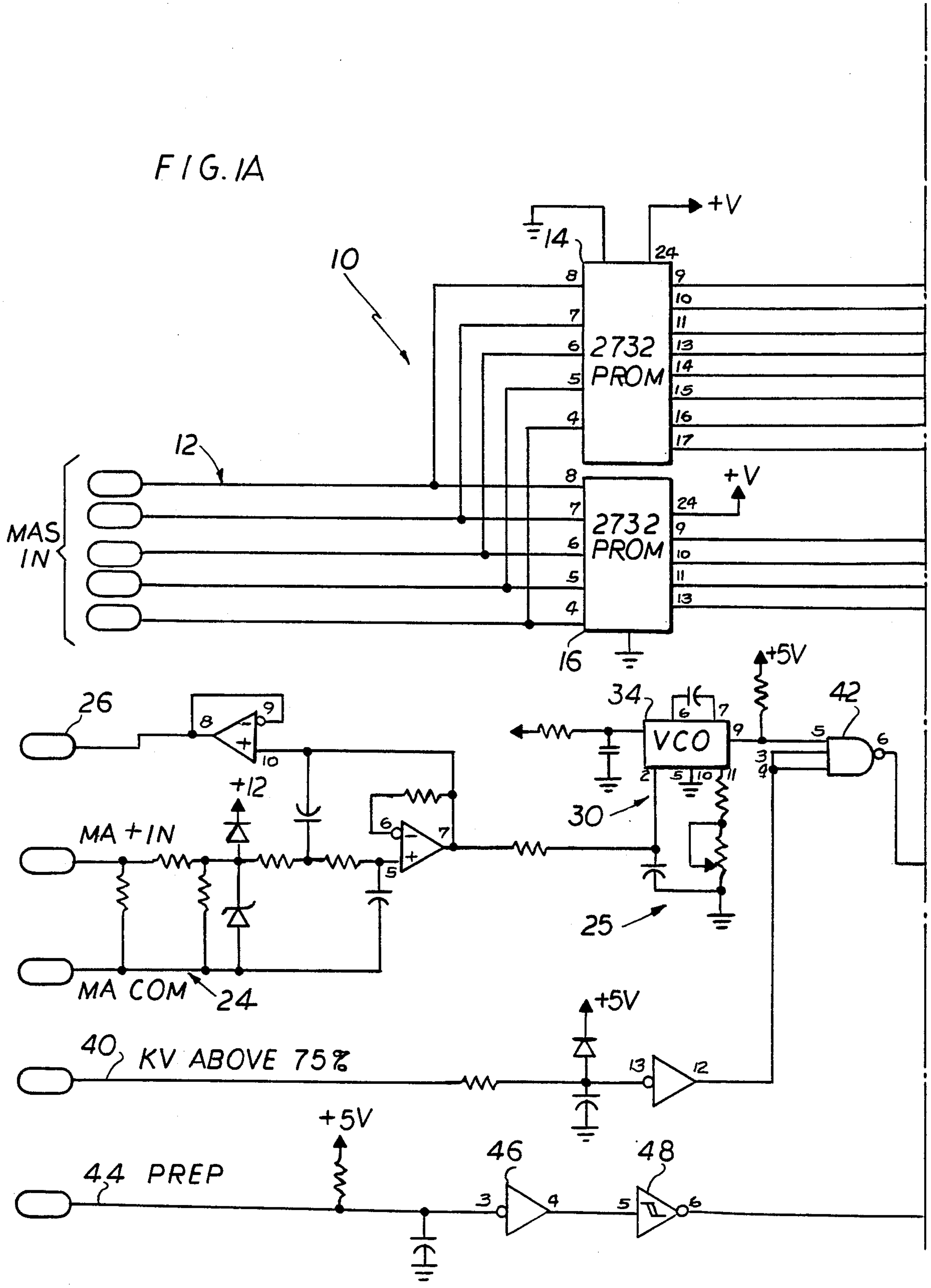
FIGS. 1A and 1B taken together form a schematic circuit diagram of an MAS regulating system in accordance with a preferred form of the invention.
Figure 1B:
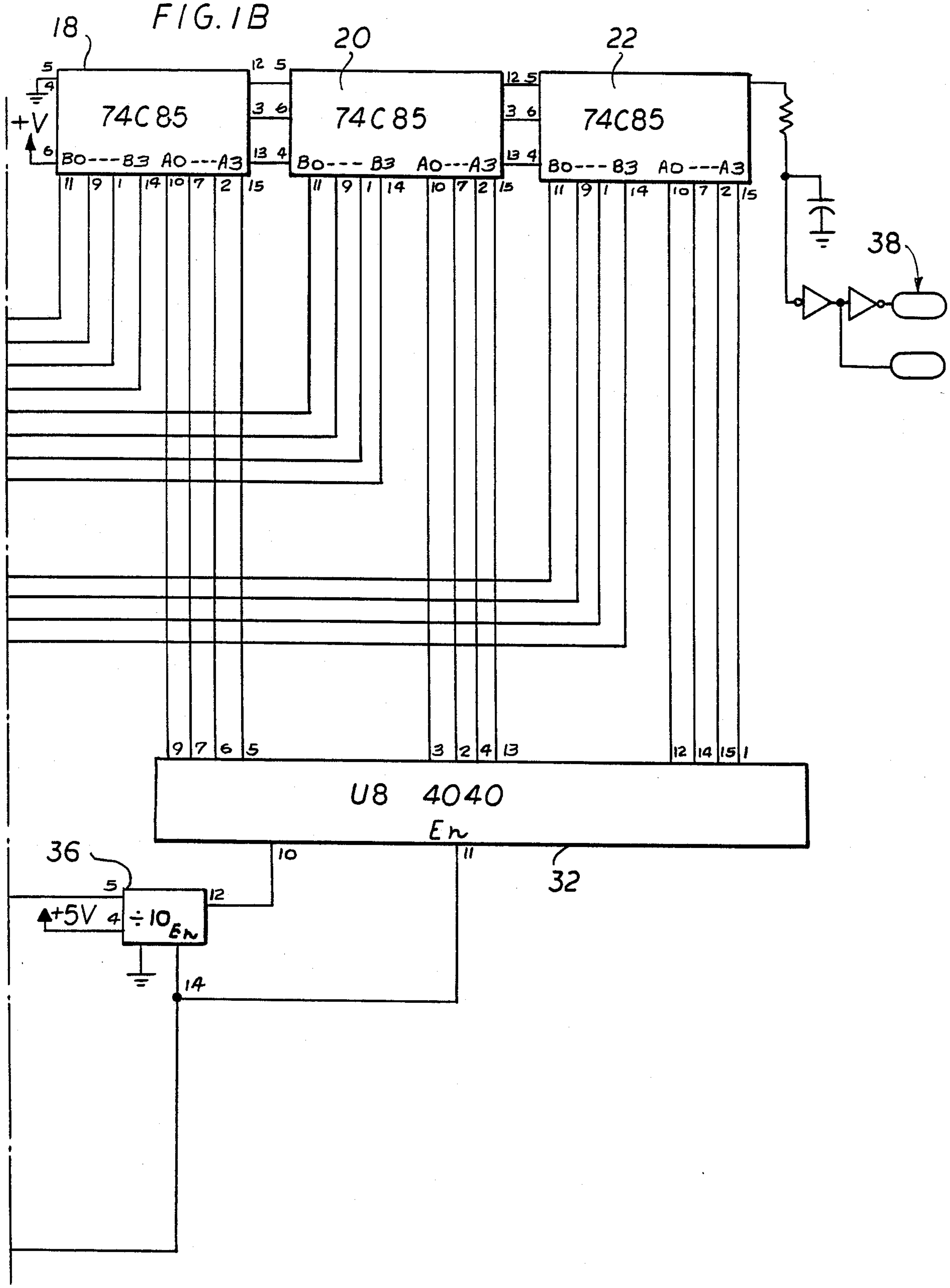

Referring now to the drawings, an MAS regulating system in accordance with the invention is embodied in a novel digital circuit, illustrated in FIGS. 1A and 1B in circuit schematic form. Initially turning to FIG. 1A, a first converter circuit means or portion 10 receives a signal corresponding to a desired MAS value set in by an operator. In the illustrated embodiment, this desired MAS value is in the form of a five-bit digital signal designated MAS IN at a five-bit input 12. The converter circuit means preferably comprises read only memory means, and preferably in the form of a pair of programmable read only memories (PROM) 14, 16, each of which is a PROM of the type generally designated 2732. Table 1, reproduced hereinbelow, gives the conversion code for the hexadecimal format digital signal or "data" produced by each of the PROMS 14 (LSD) and 16 (MSD) for producing the least significant digit (LSD) and the most significant digit (MSD) of the resultant digital MAS signal. This first or desired MAS digital signal is fed to first inputs of each of three similar four-bit comparator circuits 18, 20 and 22, which are preferably 4-bit magnitude comparators of the type generally designated 74C85. In the illustrated embodiment, this desired MAS digital signal is fed to the "B" inputs of these comparitors.

Referring again to FIG. 1A, the actual milliamp current (MA) in the X-ray tube is sensed across a pair of inputs designated MA+ in and MA common (COM). These two inputs feed a current-to-voltage converter circuit designated generally by reference numeral 24 which converts the actual MA current in the X-ray tube to a corresponding MA voltage. This MA voltage is also fed out for further suitable uses such as in MA voltage regulation, at an output designated 26.

In accordance with a feature of the invention, the MA voltage from circuit 24 is also fed to a novel digital integrator circuit designated generally by reference numeral 25, and including a VCO circuit means or portion 30 and a counter circuit means or portion 32. Preferably, the VCO circuit employs a VCO integrated circuit component 34, and preferably one of the type generally designated AD537.

The VCO 34 produces an MA frequency signal corresponding to the MA voltage and hence to the actual MA current in the X-ray tube. Advantageously, by counting the frequency signal produced over time, the counter circuit 32 integrates the MA signal to correspond to the actual MAS values. That is, the counter 32 produces a 12-bit signal which digitally increases over time, thus in effect "integrating" the MA signal to form a MAS signal for comparison with the desired MAS digital signal produced by the PROM's 14 and 16. Accordingly, the counter 32, which is preferably a 12-stage ripple carry binary counter of the type generally designated CD4040, feeds its 12-bit output to respective ones of the "A" inputs of the comparators 18, 20 and 22.

In accordance with the preferred form of the invention illustrated, the frequency signal from the VCO 34 is fed into the counter 32 by way of an intervening divide-by-10 counter/divider integrated circuit 36. In the illustrated embodiment, the divider circuit 36 preferably comprises a synchronous four-bit up/down decade counter of the type generally designated 74C192. The counter/divider 36 is interposed in the circuit for the purpose of properly scaling the frequency produced by the VCO 34, in order to properly scale the actual MAS signal for direct comparison with the desired MAS signal, following its digital integration by the counter 32.

Hence, the two digital signals are thus in the same scale and in the same "format". It will be seen that the three comparators 18, 20 and 22 are cascaded together with a final comparator output feeding a pair of control signal outputs which produce a pair of relatively inverted logic control signals. In the illustrated embodiment, the "A less than B" output was selected; however, it will be apparent that the logic utilized for the actual control signal may be either of these inverse logic signals, without deparing from the invention. The logic control signal produced at the complementary logic outputs 38 is preferably utilized as a control or pilot signal to cause termination or stopping of the exposure or imaging process. This control signal is thus given when the milliamp seconds actually delivered by the X-ray tube becomes equal or greater than the desired or target amount or value set by the operator.

Advantageously, the novel digital logic control system illustrated and described hereinabove lends itself to accommodating further control functions which may be simply and inexpensively accommodated by digital means as shown in the preferred embodiment illustrated herein.

For example, an additional kilovoltage (KV) control logic signal (KV above 75%) is also received at an input 40 and is utilized to control an additional gate circuit 42 interposed between the output of the VCO 34 and the input of the divider circuit 36. In the illustrated embodiment, the logic gate 42 comprises a three-input NAND gate, preferably of the type generally designated CD4023. However, alternative logic components may be utilized if desired without departing from the invention.

In similar fashion, a further logic signal indicating preparedness or readiness of the X-ray apparatus to make an exposure is received on an input 44, designated as the prepared or PREP input. This logic signal goes to a logic zero or low state when the generator is prepared to make an exposure. This signal is arranged to energize or enable respective enable pins (En) of both components 32 and 36, by way of an inverter buffer 46 and a schmitt trigger 48. In the illustrated embodiment the inverter buffer is preferably part of an integrated circuit of the type generally designated CD9093 and the schmitt trigger 48 is preferably a part of an integrated circuit of the type generally designated 74C14. However, alternative logical arrangements may be utilized without departing from the invention.

It should be noted that the logic signal on input 40 comprising a kilovoltage (KV) signal is selected in the illustrated embodiment such that the input 40 goes to a logic zero or low state when the X-ray tube kilovoltage is about 75% of the selected kilovoltage value. Accordingly, the milliamp signal is in effect integrated to form an MAS signal, only when both the logic signals at inputs 40 and 44 are in a logic zero or low state, indicating both that the generator is prepared to make an exposure and that the X-ray tube kilovoltage is above 75% of its selected value.

TABLE 1

| "LSD" | | | "MSD" | | |
|---|---|---|---|---|---|
| ADDRESS | | DATA | ADDRESS | | DATA |
| DEC | HEX | HEX | DEC | HEX | HEX |
| 0 | 0000 | 08 | 0 | 0000 | 00 |
| 1 | 0001 | 08 | 1 | 0001 | 00 |
| 2 | 0002 | 08 | 2 | 0002 | 00 |
| 3 | 0003 | 08 | 3 | 0003 | 00 |
| 4 | 0004 | 0A | 4 | 0004 | 00 |
| 5 | 0005 | 0D | 5 | 0005 | 00 |
| 6 | 0006 | 0F | 6 | 0006 | 00 |
| 7 | 0007 | 12 | 7 | 0007 | 00 |
| 8 | 0008 | 17 | 8 | 0008 | 00 |
| 9 | 0009 | lC | 9 | 0009 | 00 |
| 10 | 000A | 26 | 10 | 000A | 00 |
| 11 | 000B | 30 | 11 | 000A | 00 |
| 12 | 000C | 3B | 12 | 000C | 00 |
| 13 | 000D | 4E | 13 | 000D | 00 |
| 14 | 000E | 62 | 14 | 000E | 00 |
| 15 | 000F | 76 | 15 | 000F | 00 |
| 16 | 0010 | 94 | 16 | 0010 | 00 |
| 17 | 0011 | C6 | 17 | 0011 | 00 |
| 18 | 0012 | F8 | 18 | 0012 | 00 |
| 19 | 0013 | 2A | 19 | 0013 | 01 |
| 20 | 0014 | 5C | 20 | 0014 | 01 |
| 21 | 0015 | 8E | 21 | 0015 | 01 |
| 22 | 0016 | F4 | 22 | 0016 | 01 |
| 23 | 0017 | 58 | 23 | 0017 | 02 |
| 24 | 0018 | BC | 24 | 0018 | 02 |
| 25 | 0019 | 52 | 25 | 0019 | 03 |
| 26 | 001A | E8 | 26 | 001A | 03 |
| 27 | 001B | E2 | 27 | 001B | 04 |
| 28 | 001C | DC | 28 | 001C | 05 |
| 29 | 001D | D0 | 29 | 001D | 07 |
| 30 | 001E | C4 | 30 | 001E | 09 |
| 31 | 001F | B8 | 31 | 001F | 0B |

While particular embodiments of the invention have been shown and described in detail, it will be obvious to those skilled in the art that changes and modifications of the present invention, in its various aspects, may be made without departing from the invention in its broader aspects, some of which changes and modifications being mattes of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A MAS regulating system for a high frequency medical X-ray generator having an X-ray tube, for producing a control signal to stop the exposure when the milliamp-seconds delivered by the X-ray tube becomes equal to or greater than a desired maximum amount set by an operator, said system comprising: first converter circuit means for converting a signal corresponding to a desired MAS value set by the operator into a first digital signal having a predetermined format; digital integrator circuit means for integrating and converting the actual MA current in the X-ray tube to a digital MAS signal corresponding to the actual MAS value of the current in the X-ray tube, said MAS signal being in the form of a second digital signal of the same predetermined format as said first digital signal; and comparing circuit means for comparing said first and second digital signals and for producing a control signal to stop the exposure when the second digital signal is greater than the first digital signal.

2. A system according to claim 1 wherein said first converter circuit means comprises PROM means.

3. A system according to claim 1 wherein said digital integrator circuit means includes a current-to-voltage converter circuit means for converting said actual MA current to a corresponding MA voltage signal leaving a voltage value corresponding to said actual MA current.

4. A system according to claim 3 wherein digital integrator circuit means further comprises VCO means coupled in circuit with said current-to-voltage converter circuit means for converting said MA voltage signal to a MA frequency signal having a frequency corresponding to the voltage value of the MA voltage signal.

5. A system according to claim 4 wherein said digital integrator circuit means further includes counter circuit means coupled in circuit with said VCO means for counting the cycles of said MA frequency signal so as to integrate the same and develop said second digital signal having a digital value corresponding to the actual MAS value of the current in the X-ray tube.

6. A system according to claim 5 wherein said digital integrator circuit means further includes divider circuit means coupled intermediate said VCO means and said counter circuit means for scaling the frequency of said MA frequency signal in a predetermined fashion for causing said second digital signal to be in the same scale as the first digital signal.

7. A system according to claim 5 and further including a first inhibiting circuit means coupled with said digital integrator circuit means and responsive to a control signal produced when the KV value of the X-ray tube is less than 75% of a desired KV value for inhibiting production of said MAS frequency signal.

8. A system according to claim 7 and further including second inhibiting circuit means coupled with said digital integrator circuit means and responsive to a control signal produced when the X-ray generator is prepared to make an exposure for inhibiting the production of said second digital signal until said control signal is produced.

* * * * *